(12) United States Patent
Shanahan et al.

(10) Patent No.: US 6,231,327 B1
(45) Date of Patent: May 15, 2001

(54) COMPOSITE EXTRUSION AND PATTERNING MACHINE FOR IRREGULARLY CURVED EDGES AND METHOD OF MANUFACTURE THEREOF

(75) Inventors: James William Shanahan; Bobby Allen Mihlhauser, both of Mount Pleasant, TX (US)

(73) Assignee: Mastercraft Industries, L.P., Mount Pleasant, TX (US)

( * ) Notice: Subject to any disclaimer, the term of this patent is extended or adjusted under 35 U.S.C. 154(b) by 0 days.

(21) Appl. No.: 09/346,796

(22) Filed: Jul. 2, 1999

(51) Int. Cl.[7] .................................................. B29C 43/08
(52) U.S. Cl. .......................... 425/113; 425/115; 425/327; 264/252; 29/428
(58) Field of Search ..................... 425/115, 110, 425/113, 327, DIG. 5; 264/134, 135, 252, 310; 29/17.4, 428

(56) References Cited

U.S. PATENT DOCUMENTS

| | | | |
|---|---|---|---|
| 3,524,781 | * | 8/1970 | Winterroth et al. ................. 156/231 |
| 5,063,014 | * | 11/1991 | Cakmakci ............................. 264/151 |
| 5,362,428 | * | 11/1994 | Tsujino et al. ....................... 264/40.5 |
| 5,382,395 | * | 1/1995 | Hoenke ................................ 264/40.7 |
| 5,551,855 | * | 9/1996 | Yada et al. ............................ 425/113 |
| 5,632,939 | * | 5/1997 | Ito et al. ............................... 264/40.5 |
| 5,744,172 | * | 4/1998 | Todaka et al. ....................... 425/113 |
| 5,814,352 | * | 9/1998 | Imura et al. .......................... 425/112 |

\* cited by examiner

Primary Examiner—James P. Mackey
Assistant Examiner—Joseph S Del Sole

(57) ABSTRACT

A material extrusion and patterning machine for a workpiece having an irregularly curved edge and a method of manufacturing the same. In one embodiment, the machine includes: (1) a frame, (2) a fixture coupled to the frame for rotation relative thereto and having a clamp adapted to hold the workpiece, (3) an extrusion head, coupled to the frame for translation relative thereto and adapted to move relative to the axis of rotation to follow the edge and (4) a mold mount, coupled to the frame for translation relative thereto and adapted to move relative to the axis of rotation to follow the edge, the extrusion head and mold mount cooperating to deposit the material on the edge and allow a mount to place a pattern on the material as the workpiece rotates relative to the frame.

21 Claims, 4 Drawing Sheets

COMPOSITE EXTRUSION AND PATTERNING MACHINE FOR IRREGULARLY CURVED EDGES AND METHOD OF MANUFACTURE THEREOF

TECHNICAL FIELD OF THE INVENTION

The present invention is directed, in general, to composite extrusion machines and, more specifically, to a composite extrusion and patterning machine that can extrude a composite onto an irregularly curved edge and place a pattern on the composite in situ and a method of manufacturing the machine.

BACKGROUND OF THE INVENTION

A particularly desirable aspect of furniture and cabinetry has been high-relief, decorative trim. Decorative elements on furniture and cabinetry have been traditionally applied as preformed molding incorporating the desired shape. For example, in the case of display shelves, decorative molding is often used on the edge of a wood shelf to hide the end and side grain. Solid wood molding is typically formed by multiple passes of routing and shaping tools, depending upon the complexity of the decorative design. Some molding, however, is manufactured by extruding a composite (essentially wood fiber and adhesive) material through a cross-sectional shaping nozzle and allowing the material to harden on a flat surface. The resulting molding is usually fastened to cabinetry by wire nails, brads and/or glue. Typically, the molding is mitered at the corners where the straight edges meet. However, this method of applying preformed molding is not useful for shelves, or other similar wood shapes that have other than straight edges. This is because the straight molding does not readily conform to shapes other than straight edges.

For regularly shaped objects, e.g., circular platters or disks, it is relatively easy to form a pattern on an edge of the platter. That is, the molding and shaping can take place at a constant distance from the centerpoint. In these cases, the workpiece may rotate with the applicator at a fixed distance, or vice versa. For irregularly shaped workpieces this approach does not work well because of the difficulty of maintaining a constant distance from the applicator to the workpiece edge. Alternatively, for shelves having other than straight edges, it is possible to have a skilled craftsman carve the relief from an oversize workpiece to form the desired pattern. However, this method is cost-prohibitive in terms of time, material and labor. Alternatively, for regularly shaped objects such as a picture frame, a custom mold may be made that fits around the object, such as a basic wooden picture frame. The composition is then injected into the mold, filling the voids and forming the desired shape. This system, however, is expensive in that a specific mold must be made for each different size frame. Therefore, for many commercial products, especially decorative display shelves, it would be highly desirable to directly form decorative molding on the edges of irregularly shaped wood products.

Accordingly, what is needed in the art is a machine that will apply and form decorative material on the edge of an irregularly shaped wood workpiece by extrusion of a composite material.

BRIEF SUMMARY OF THE INVENTION

To address the above-discussed deficiencies of the prior art, the present invention provides a material extrusion and patterning machine for a workpiece having an irregularly curved edge and a method of manufacturing the same. In one embodiment, the machine includes: (1) a frame, (2) a fixture coupled to the frame for rotation relative thereto and having a clamp adapted to hold the workpiece, (3) an extrusion head, coupled to the frame for translation relative thereto and adapted to move relative to the axis of rotation to follow the edge and (4) a mold mount, coupled to the frame for translation relative thereto and adapted to move relative to the axis of rotation to follow the edge, the extrusion head and mold mount cooperating to deposit the material on the edge and allow a mount mold to place a pattern on the material as the workpiece rotates relative to the frame.

The present invention therefore introduces a machine that is equipped to deposit and pattern a plastic material (such as a composite wood product, or "compo") on the irregularly curved edge of a workpiece, such as a piece of wood. "Irregularly curved" is defined as having a varying radius of curvature or varying distance from a single point. A workpiece having an irregularly curved edge therefore cannot be circular. The present invention provides a machine that adjusts for varying radii of curvature or distance from a point on the workpiece by allowing the extrusion head and mold mount to move with respect to the workpiece. Alternatively, the machine may be configured to apply and pattern the compo on a face of the workpiece.

In one embodiment of the present invention, the fixture holds the workpiece such that the edge is radially outward from an axis of rotation of the fixture. Thus, the edge on which the material is desired to be deposited and patterned is proximate an outer periphery of the fixture, allowing the extrusion head and mold mount to be located radially outward of the workpiece from the fixture's axis of rotation. Of course, the extrusion head and mold mount may be located radially inward from an edge defining a periphery of an aperture in the workpiece, allowing such edge to be coated and patterned.

In one embodiment of the present invention, the fixture has a second clamp for holding a second workpiece oriented such that a second edge of the second workpiece is located radially outward of the axis of rotation. Sometimes it is not necessary to coat and pattern the entire edge of a workpiece (for example, when some of the edge is hidden and of no decorative value when the workpiece is eventually installed, as with a shelf) The present invention introduces an embodiment wherein the fixture can hold two workpieces. Preferably, one workpiece can be coated and patterned while the other (having been coated and patterned) is being replaced with one to be coated and patterned. However, one who is skilled in the art will recognize that the fixture may readily be configured to hold multiple workpieces.

In one embodiment of the present invention, the machine further includes: (1) a cam coupled to the fixture and having a surface that corresponds to a shape of the edge and (2) a follower, coupled to the extrusion head, that contacts and follows the surface to guide the extrusion head. Alternatively, the extrusion head can follow the edge itself, although this may wear the edge. In yet another embodiment, data concerning the geometry of the edge are preprogrammed into the machine, allowing the extrusion head and mold mount to be moved without having to sense where the edge is. Still further, the edge can be sensed by other than mechanical means, such as by optical sensors, coupled to a programmer that can compensate for extreme irregularities in workpiece shape.

In one embodiment of the present invention, the machine further includes a mold, the pattern being contained in indentations in the mold. The mold edges may be forcibly applied to the workpiece so as to form a tear line to separate excess material from the workpiece. Alternatively, the pattern may be contained on a tape applied on top of the material by the mold.

In one embodiment of the present invention, the machine further includes a mold, the mold being circular and adapted to rotate to place the pattern on the material. Alternatively, the mold may be of any other shape. For example, the mold may have multiple forms on a single mold wheel that are indexed to apply desired shapes.

In one embodiment of the present invention, the machine further includes: (1) a variable rate material pump coupled to the extrusion head and (2) a constant rate motor coupled to the fixture to rotate the fixture at a constant rate. Those skilled in the art will realize that an extrusion head will traverse the irregularly curved edge of a workpiece at a rate that depends upon the distance of the edge from the axis of rotation. Since this distance varies, the rate of traversal varies, and the rate at which material is extruded from the extrusion head should vary to compensate. In an alternative embodiment, the material pump delivers the material to the extrusion head at a constant rate, but the rate of rotation of the fixture varies to compensate.

The foregoing has outlined, rather broadly, preferred and alternative features of the present invention so that those skilled in the pertinent art may better understand the detailed description of the invention that follows. Additional features of the invention will be described hereinafter that form the subject of the claims of the invention. Those skilled in the pertinent art should appreciate that they can readily use the disclosed conception and one or more specific embodiments as a basis for designing or modifying other structures for carrying out the same purposes of the present invention. Those skilled in the pertinent art should also realize that such equivalent constructions do not depart from the spirit and scope of the invention in its broadest form or the claims.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
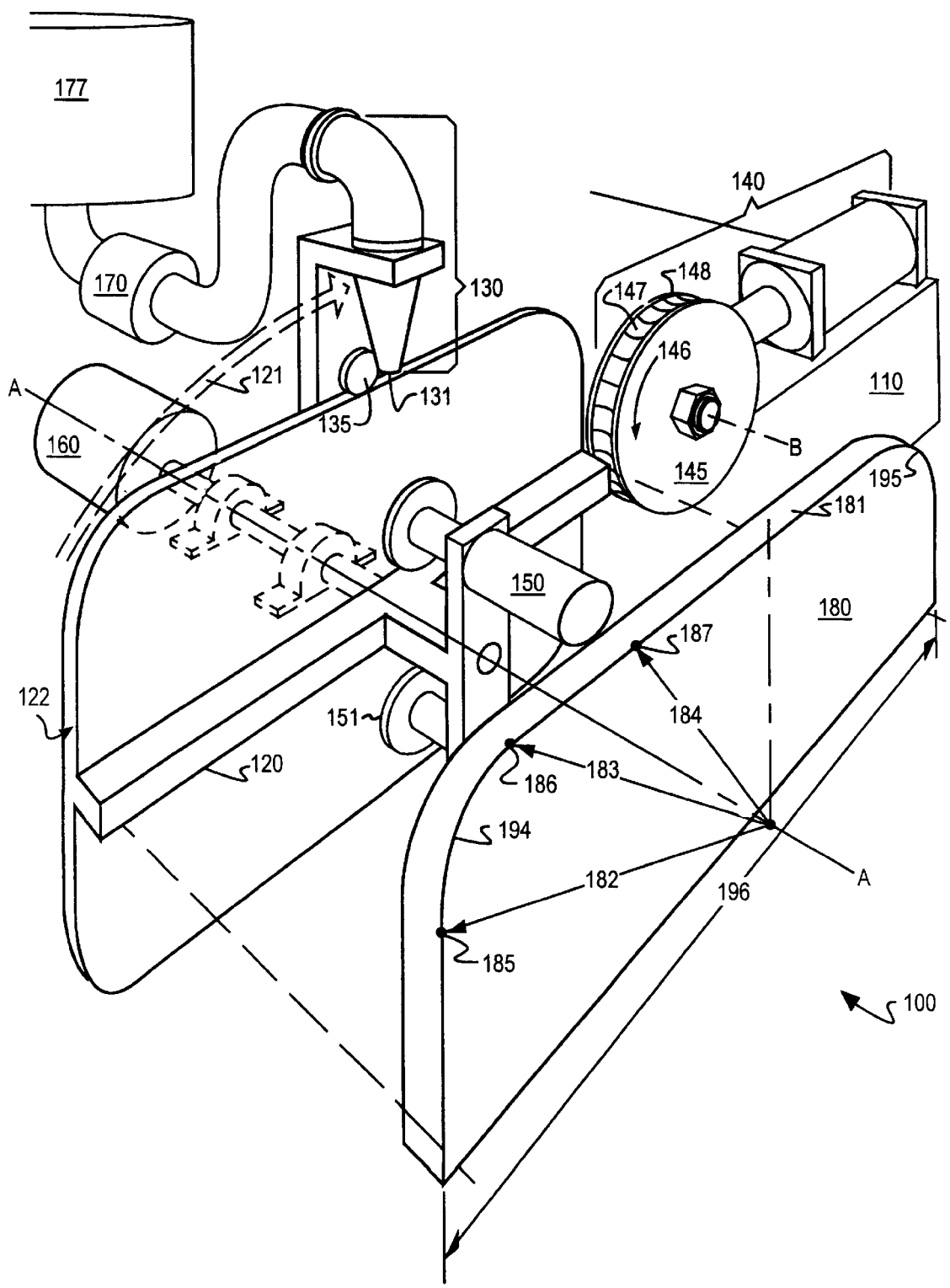
FIG. 1 illustrates a perspective view of one embodiment of a material extrusion and patterning machine constructed according to the principles of the present invention.

Referring initially to FIG. 1, illustrated is a perspective view of one embodiment of a material extrusion and patterning machine 100 constructed according to the principles of the present invention. A material extrusion and patterning machine 100 comprises a frame 110, a fixture 120, an extrusion head 130 and a mold mount 140. The fixture 120 further comprises a clamp 150 configured to securely hold a workpiece 180. The clamp 150 may be implemented in a mechanical, pneumatic or vacuum manner. The fixture 120 is rotatably coupled to the frame 110 and rotates clockwise 121 with the workpiece 180 about an axis A—A driven by a constant speed motor 160. The extrusion head 130 is in fluid communication with a variable rate composite material pump 170 and a material tank 177.

The workpiece 180 is held in the fixture 120 so that an edge 181 of the workpiece 180 is radially outward from the axis A—A of rotation. In the illustrated embodiment, the workpiece 180 is a flat, essentially-rectangular piece of wood of which two corners 194, 195 on a long edge 196 have been rounded. This configuration is very useful as a shelf that will be enhanced by application of an edge molding. One who is skilled in the art will readily recognize the difficulty of attaching or applying an edge molding to a shelf of this configuration. As can be clearly seen, a radial distance 182, 183, 184 from the axis A—A of rotation to points 185, 186, 187 respectively, on the workpiece edge 181 varies with the workpiece geometry. In the illustrated embodiment, the fixture 120 further includes a second clamp 151, configured to hold a second workpiece (not shown) in a similar manner as the clamp 150. An edge of the second workpiece is therefore positioned to be patterned as was the first workpiece 180.

In one embodiment, the extrusion head 130 has a head follower 135 that traces an edge 122 of the fixture 120. In this embodiment, the fixture 120 acts as a pattern or cam that replicates the workpiece 180 shape. In an alternative embodiment, the follower 135 may follow the edge 181 of the workpiece 180. In yet another embodiment, the follower 135 may be implemented by using other edge sensing methods such as optical, electro-optical, etc. In still another embodiment, a digital description of the geometry of the edge 181 may be preprogrammed into the machine 100, thus allowing the extrusion head 130 to move without having to directly sense the edge 181 location.

In a similar fashion to the extrusion head 130, the mold mount 140 is movably coupled to the frame 110 and to the fixture 120. A mold 145 is mounted to the mold mount 140 and rotates counter-clockwise 146 about an axis B—B. The mold 145 follows the edge 181 contours of the workpiece 180 as the workpiece 180 rotates. In the illustrated embodiment, the mold 145 is circular in cross section with a pattern 147 formed in an edge 148. In alternative embodiments, the mold 145 may follow the edge 181 by means similar to those previously described for the extrusion head 130.

Figure 2:
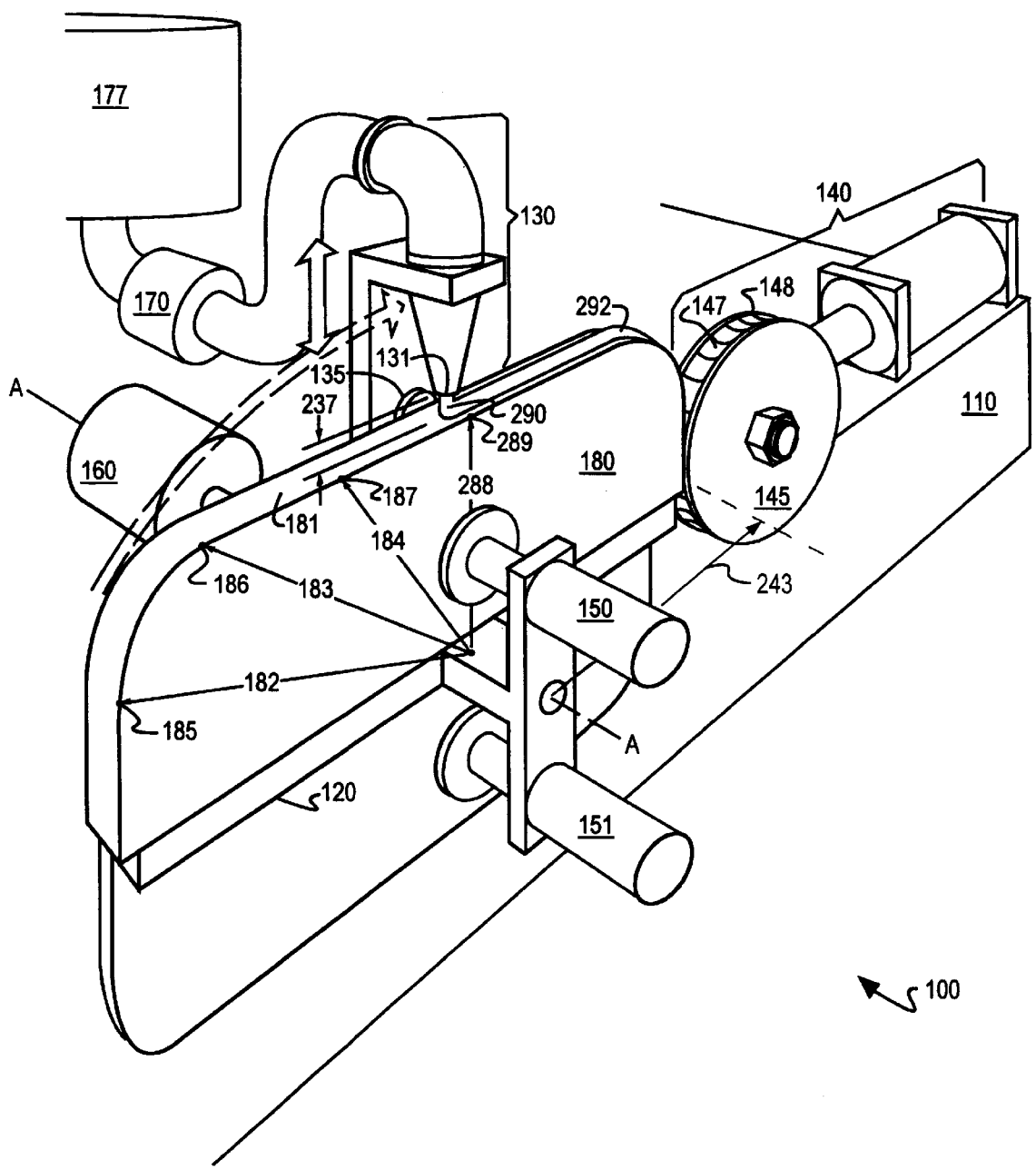
FIG. 2 illustrates a perspective view of the material extrusion and patterning machine of FIG. 1 with a workpiece installed.

Referring now to FIG. 2, illustrated is a perspective view of the material extrusion and patterning machine of FIG. 1 with the workpiece installed. The extrusion head 130 is movably coupled to the frame 110 and to the fixture 120, so as to enable the extrusion head 130 to move radially outward and inward from the axis A—A of rotation as a local radius 288 at a material application point 289 changes to accommodate changing radial distances such as 182, 183, 184.

The composite material pump 170 supplies a composite material 290 from the material tank 177 to the extrusion head 130. The composite material 290 may be a semi-solid or paste comprising a wood product (or other fiber) and an adhesive, or any other suitable material, such as plaster of paris, that will self-adhere to the workpiece 180 and is capable of being shaped. As the workpiece 180 rotates in the fixture 120, the head follower 135 positions the end 131 of the extrusion head 130 at an essentially fixed distance 237 from the workpiece edge 181. This essentially fixed distance 237 assures that a composite material 290 deposits on the edge 181 in a nearly-uniform bead 292. As the rate of rotation of the fixture 120 and the workpiece 180 is a constant, the variable rate composite material pump 170 is needed to compensate for a need to deposit material 290 at a constant rate per inch of edge movement under the extrusion head 130. Implementation of the variable rate composite material pump 170 may require a CNC (computer numerically controlled) system or a variable gear pump. Alternatively, the rate of rotation may be varied by using an analog closed loop feedback loop and a DC controller.

While the rate of rotation (angular velocity=Δθ/Δt) remains constant, the local radius 288 may be changing, thus changing the tangential velocity. That is, for a greater local radius 288, (e.g., the radial distance 182), the change of edge distance for the same change of time is greater than for a smaller local radius 288, (e.g. the radial distance 184). Thus the amount of edge 181 of the workpiece 180 traversed in the same Δt is greater and the amount of composite material required is also greater. The variable rate material pump 170 compensates for this variability in required composite material 290.

In some circumstances, for example when the length to width ratio exceeds about 4:1, the rotation of the fixture may cease. This can be overcome by equipping the fixture for multiple workpieces so that the length to width ratio approximates about 1:1.

As a mold local radius 243 varies, the mold mount 140 extends or retracts the mold 145 along the radius 243 so that the mold 145 is held against the edge 181. As the mold 145 passes over the nearly-uniform bead 292, the pattern 147 is imparted to the material 290.

Figure 3:
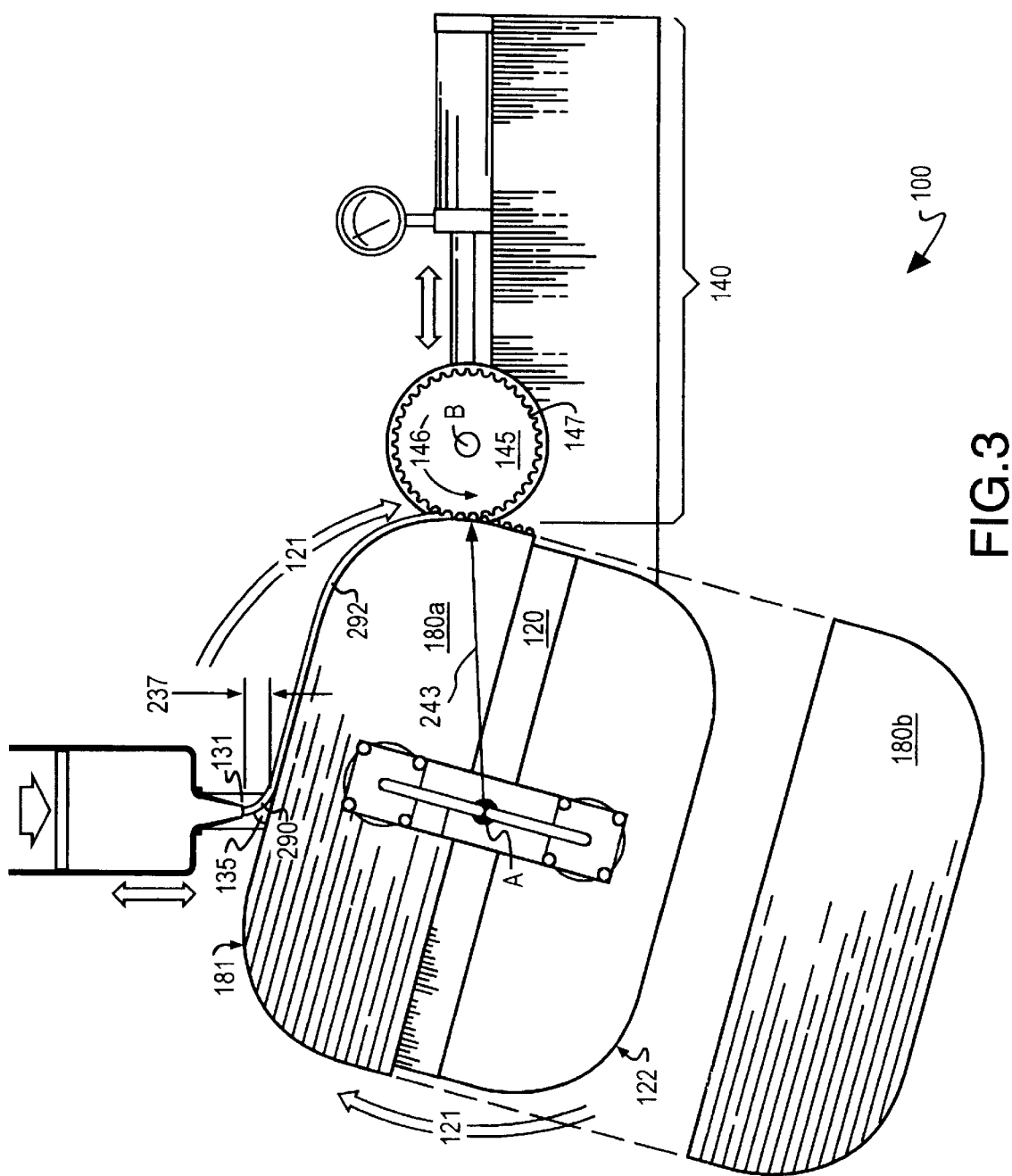
FIG. 3 illustrates a side view of certain structures of the material extrusion and patterning machine of FIG. 1.

To more clearly describe the interaction of the various parts of the invention, refer now to FIG. 3 wherein is illustrated a side view of certain structures of the material extrusion and patterning machine of FIG. 1. Continuing reference to FIG. 2 may also be required. In the illustrated embodiment, one workpiece 180a is undergoing composite extrusion and patterning. Another workpiece 180b is awaiting installation on the fixture 120. As the fixture 120 and workpiece 180a rotate clockwise 121 about the axis A—A (designated by point A in this view), the variable rate pump 170 supplies composite material to the extrusion head 130. The follower 135 traces the edge 122 of the fixture 120 and adjusts the vertical location of the extrusion head 130 so as to maintain an essentially constant distance 237 of the extrusion head end 131 from the workpiece edge 181. In some circumstances, it may be advantageous for the extrusion head 130 to be a greater distance 237 from the workpiece edge 181 so as to allow the material 190 to partially cure, thereby enhancing adhesion to the workpiece edge 181. The material 290 deposits on the workpiece edge 181 and is fed into the mold 145, where the pattern 147 is imparted to the composite material bead 292. As the fixture 120 and workpiece 180 rotate clockwise 121, the mold mount 140 follows the edge 181 of the workpiece 180a and the mold 145 rotates counterclockwise 146, impressing a shape into the material bead 292. The mold mount 140 enables the mold 145 to conform to the changing radial distance 243.

Figure 4:
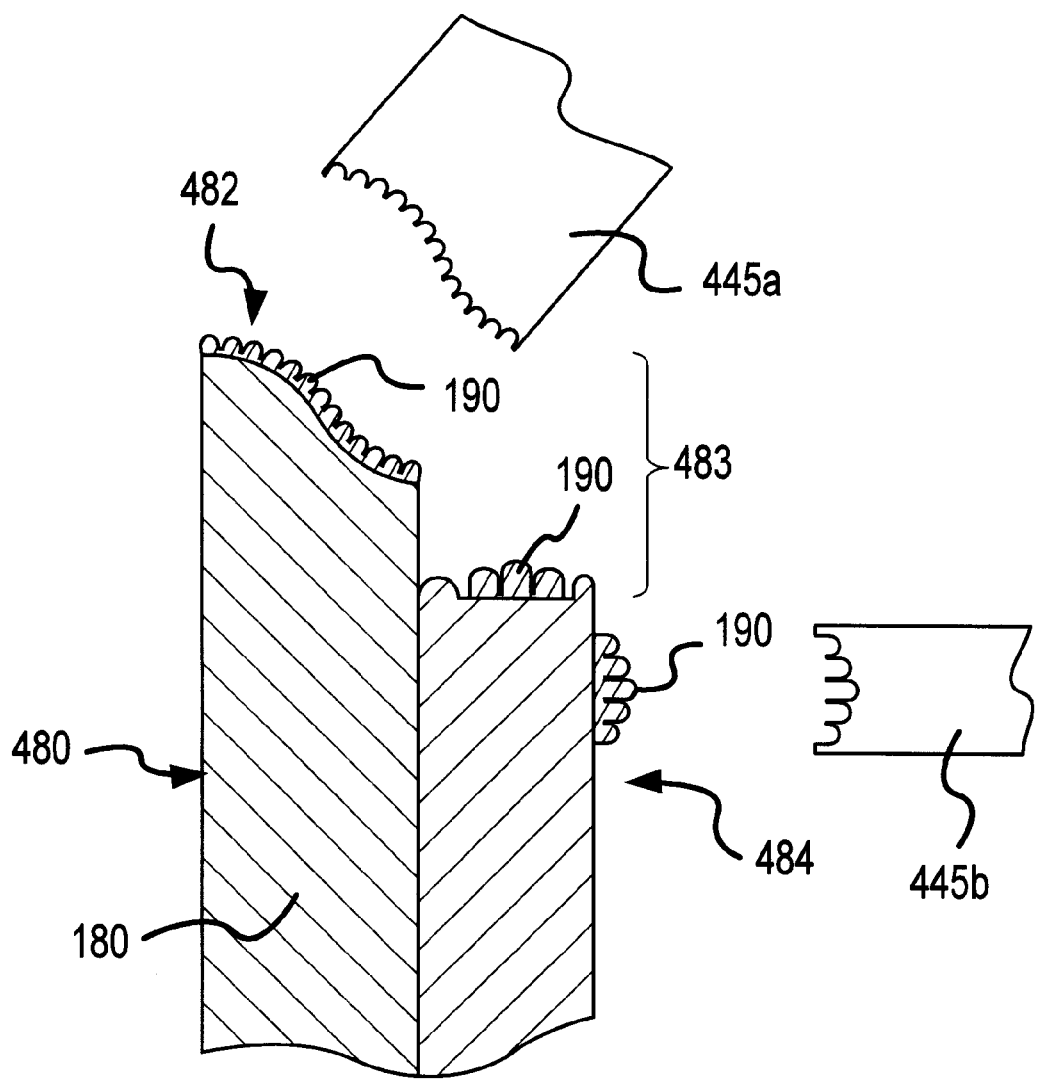
FIG. 4 illustrates a sectional view of an alternative workpiece with multiple applications of the material of FIG. 1.

Referring now to FIG. 4, illustrated is sectional view of an alternative workpiece with multiple applications of the material of FIG. 1. While the prior description has addressed an essentially-rectangular piece of wood with decorative molding placed on a workpiece edge, the present invention also envisions application to shelves or other similar applications embodying more complex edge shapes. For example, the material 190 need not be deposited and formed only on an edge 181 (see FIG. 1) of the workpiece that is normal to a plane 480 of the workpiece 180. The workpiece edge may be contoured 482, beveled, or of a tiered cross-section 483. The material 290 may also be applied to a planar surface 484 of the workpiece 180, in which case the orientation of the extrusion head 130 and molds 445a, 445b must be geometrically adjusted. Such applications may be accomplished either simultaneously with multiple molds or, in some cases, sequentially. One who is skilled in the art will readily conceive how such modifications are achieved in light of the previous description.

Thus, a machine 100 has been described that extrudes a semi-solid composite material bead 292 upon an edge 181 of an irregularly curved workpiece 180 and impresses upon the bead 292 a pattern 147 as decorative trim. The method and machine eliminate a need for mechanical fasteners or glue while solving the problem of decorating an irregularly curved edge. One who is skilled in the art will recognize that the present invention may also be adapted to produce a similar decorative trim on the inside edge of the periphery of an aperture in a workpiece.

Although one or more embodiments of the present invention have been described in detail, those skilled in the pertinent art should understand that they can make various changes, substitutions and alterations thereto without departing from the spirit and scope of the invention in its broadest form or the claims.

What is claimed is:

1. A material extrusion and patterning machine for a workpiece having an irregularly curved edge, comprising:
   a frame;
   a fixture, having an axis of rotation, coupled to said frame for rotation relative thereto and having a clamp adapted to hold said workpiece;
   an extrusion head, coupled to said frame for translation relative thereto and adapted to move relative to said axis of rotation to follow said edge; and
   a mold mount, coupled to said frame for translation relative thereto and adapted to move relative to said axis of rotation to follow said edge, said extrusion head and mold mount cooperating to deposit material on said edge and allow a mold to place a pattern on said material as said workpiece rotates relative to said frame.

2. The machine as recited in claim 1 wherein said fixture holds said workpiece such that said edge is radially outward from an axis of rotation of said fixture.

3. The machine as recited in claim 1 wherein said fixture has a second clamp for holding a second workpiece oriented such that a second edge of said second workpiece is located radially outward of said axis of rotation.

4. The machine as recited in claim 1 further comprising:
   a cam coupled to said fixture and having a surface that corresponds to a shape of said edge; and
   a follower, coupled to said extrusion head, that contacts and follows said surface to guide said extrusion head.

5. The machine as recited in claim 1 further comprising a mold, said pattern being contained in indentations in said mold.

6. The machine as recited in claim 1 further comprising a mold, said mold being circular and adapted to rotate to place said pattern on said material.

7. The machine as recited in claim 1 further comprising:
   a variable rate material pump coupled to said extrusion head; and
   a constant rate motor coupled to said fixture to rotate said fixture at a constant rate.

8. A method of manufacturing a material extrusion and patterning machine for a workpiece having an irregularly curved edge, comprising:

forming a frame;

coupling a fixture, having an axis of rotation, to said frame for rotation relative thereto, said fixture having a clamp adapted to hold said workpiece;

coupling an extrusion head to said frame for translation relative thereto, said extrusion head adapted to move relative to said axis of rotation to follow said edge; and coupling a mold mount to said frame for translation relative thereto, said mold mount adapted to move relative to said axis of rotation to follow said edge.

9. The method as recited in claim 8 wherein said fixture holds said workpiece such that said edge is radially outward from an axis of rotation of said fixture.

10. The method as recited in claim 8 wherein said step of coupling said fixture comprises the step of coupling a fixture having a second clamp for holding a second workpiece oriented such that a second edge of said second workpiece is located radially outward of said axis of rotation.

11. The method as recited in claim 8 further comprising:

a cam coupled to said fixture and having a surface that corresponds to a shape of said edge; and a follower, coupled to said extrusion head, that contacts and follows said surface to guide said extrusion head.

12. The method as recited in claim 8 further comprising coupling a mold to said mold mount, said pattern being contained in indentations in said mold.

13. The method as recited in claim 8 further comprising coupling a mold to said mold mount, said mold being circular and being adapted to rotate to place said pattern on said material.

14. The method as recited in claim 8 further comprising:

coupling a variable rate material pump to said extrusion head; and coupling a constant rate motor to said fixture.

15. An extrusion and patterning machine for depositing and patterning a composite wood product on an irregularly curved edge of a piece of wood, comprising:

a frame;

a fixture, having an axis of rotation, coupled to said frame for rotation relative thereto and having a clamp adapted to hold said piece of wood;

an extrusion head, coupled to said frame for translation relative thereto and adapted to move relative to said axis of rotation to follow said edge;

a composite pump, coupled to said frame and said extrusion head and adapted to pump said composite wood product at a given rate through said extrusion head; and a mold mount, coupled to said frame for translation relative thereto and adapted to move relative to said axis of rotation to follow said edge, said extrusion head and mold mount cooperating to deposit said composite wood product on said edge and allow a mold to place a pattern on said composite wood product as said piece of wood rotates relative to said frame.

16. The machine as recited in claim 15 wherein said fixture holds said piece of wood such that said edge is radially outward from an axis of rotation of said fixture.

17. The machine as recited in claim 15 wherein said fixture has a second clamp for holding a second piece of wood oriented such that a second edge of said second piece of wood is located radially outward of said axis of rotation.

18. The machine as recited in claim 15 further comprising:

a cam coupled to said fixture and having a surface that corresponds to a shape of said edge; and a follower, coupled to said extrusion head, that contacts and follows said surface to guide said extrusion head.

19. The machine as recited in claim 15 further comprising a mold coupled to said mold mount, said pattern being contained in indentations in said mold.

20. The machine as recited in claim 15 further comprising a mold coupled to said mold mount, said mold being circular and adapted to rotate to place said pattern on said composite wood product.

21. The machine as recited in claim 15 further comprising:

a variable rate composite pump coupled to said extrusion head; and a constant rate motor coupled to said fixture to rotate said fixture at a constant rate.

\* \* \* \* \*